United States Patent [19]
Onishi et al.

[11] Patent Number: 5,752,738
[45] Date of Patent: May 19, 1998

[54] SEAT FOR BABY CARRIAGE

[75] Inventors: Ichiro Onishi; Kenzou Kassai, both of Osaka, Japan

[73] Assignee: Aprica Kassai Kabushikikaisha, Osaka, Japan

[21] Appl. No.: 574,627

[22] Filed: Dec. 19, 1995

[30] Foreign Application Priority Data

| Dec. 26, 1994 | [JP] | Japan | 6-322981 |
| Dec. 27, 1994 | [JP] | Japan | 6-326145 |
| Jan. 5, 1995 | [JP] | Japan | 7-000241 |

[51] Int. Cl.$^6$ .................... A47C 1/02; A47D 1/02
[52] U.S. Cl. ............ 297/61; 297/350; 297/44; 297/377; 297/380; 280/642
[58] Field of Search ............ 297/377, 44, 350, 297/351, 61, 380; 280/642, 647, 658

[56] References Cited

U.S. PATENT DOCUMENTS

| 2,607,400 | 8/1952 | Witz | 297/380 |
| 4,181,356 | 1/1980 | Fleischer. | |
| 4,335,893 | 6/1982 | Carmichael et al.. | |
| 4,435,012 | 3/1984 | Kassai | 297/377 |
| 4,500,133 | 2/1985 | Nakao et al. | 297/377 |
| 4,538,830 | 9/1985 | Nakao et al.. | |
| 4,805,928 | 2/1989 | Nakao et al. | 297/377 |
| 5,195,770 | 3/1993 | Ishikura. | |
| 5,472,224 | 12/1995 | Cabagnero | 297/44 |

FOREIGN PATENT DOCUMENTS

| 0198802 | 10/1986 | European Pat. Off.. |
| 57-95255 | 6/1982 | Japan. |
| 58-33149 | 7/1983 | Japan. |
| 2044086 | 10/1980 | United Kingdom. |

*Primary Examiner*—Peter R. Brown
*Assistant Examiner*—Anthony D. Barfield
*Attorney, Agent, or Firm*—W. G. Fasse; W. F. Fasse

[57] ABSTRACT

A seat for a baby carriage has a backrest core member held by a backrest holding member through a connecting mechanism combining a bracket (77) with a slot (75) and a guide pin (76). When the backrest core member is most inclined, the pin is located against one end wall of the slot to permit moving the backrest core member downwardly thereby forcibly bringing a head guard core member into an upright position. The head guard core member is rotatably connected to a control member which uses the movement of the backrest core member for the movement of the head guard member. Thus, a head guard portion is brought into a state substantially flush with a backrest portion when the backrest assumes a relatively upright state, while the head guard portion is brought into an upright position from the upper end of the backrest portion in a most inclined state of the backrest portion.

11 Claims, 16 Drawing Sheets

SEAT FOR BABY CARRIAGE

FIELD OF THE INVENTION

The present invention relates to a seat for a baby carriage, and more particularly, it relates to a seat which can take the form of a bed when its backrest portion is most inclined.

BACKGROUND INFORMATION

A popular seat for a baby carriage has the form of a chair comprising a seat portion and a backrest portion. In such a seat, the backrest portion is generally so constructed that its inclination angle is changeable preferably to such an extent that the backrest portion extends substantially horizontally to form a bed.

Under the safety standards for the baby carriage, a seat which can assume the form of a bed must be provided with a head guard portion. The head guard portion is arranged to face the top of the head of a baby who is put on the baby carriage, for preventing the baby from putting its head out of the bed-type seat or from slipping off the seat head first.

Such a head guard portion is necessary only when the seat takes the form of a bed. However, in consideration of the comfortableness for the baby, it is not desirable that the head guard portion is located above the baby's head when the backrest portion is in a substantially upright position. Thus, it is preferable that the head guard portion can be moved in a position substantially flush with the backrest portion when the backrest portion is in a substantially upright position and that the head guard portion faces the top of the baby's head when the backrest portion is inclined to form a bed.

A seat for a baby carriage which can satisfy the aforementioned requirement is described in Japanese Patent Publication No. 58-33149 (1983) (Japanese Patent Laying-Open No. 57-95255 (1982)) in the name of the assignee of the present invention, for example.

According to this prior art, a rigid connecting link is employed for controlling the position of a head guard portion, and the extent of displacement of this connecting link is controlled by a cam mechanism comprising a combination of a guide hole and a guide pin which is movably received therein.

However, a relatively high dimensional accuracy is required for the cam mechanism comprising the combination of the guide hole and the guide pin. If the guide hole is inferior in working accuracy or the cam mechanism is inaccurately assembled, for example, the connecting link may not be displaced as desired, and hence the head guard portion may not operate as desired.

Further, the shape or form of a seat portion, a backrest portion and the head guard portion of the aforementioned seat is maintained by a seat core member, a backrest core member and a head guard core member. These core members are plates made of relatively rigid materials and these plates are covered with a flexible cover sheet.

The baby carriage described in the aforementioned Japanese Patent Publication is not foldable widthwise. A baby carriage which is foldable widthwise to make the carriage narrower when not in use, has a seat core member, a backrest core member and a head guard core member each comprising a plurality of respective plates. The plates are divided by at least single parting lines extending in parallel to the side surfaces of the baby carriage respectively, in order to allow folding the baby carriage widthwise.

However, the divided structures of the seat core member, the backrest core member and the head guard core member have the following disadvantages: When a baby is put on the seat in an open, unfolded state of the baby carriage, any one or all the core members may be bent along the parting lines by the baby's weight, to dent the seat where the parting line is.

In a most inclined state of the backrest portion, in particular, a considerable part of the baby's weight is applied to this portion as compared with a substantially upright position. Thus, the aforementioned denting of the seat is substantial particularly when the backrest portion is most inclined.

In order to minimize the influence exerted on the baby by the aforementioned denting, it is effective to form the seat core member and the backrest core member respectively of three seat plates and three backrest plates. The three plates of the seat and of the backrest are separated from one another by pairs of parting lines extending in parallel with the side surfaces of the baby carriage. The central seat plate and the central backrest plate are positioned along the cross-directional center of the baby's body, whereby the seat is prevented from being dented at least along the cross-directional center of the baby's body.

In order to solve the problem of denting, there has also been proposed a technique of positively hinging neighboring seat plates and neighboring backrest plates with each other respectively. When these plates are hinged with each other, the seat core member and the backrest core member are preferably tilted or rotated upwardly and forwardly respectively in response to folding the baby carriage widthwise, so as not to bend the plates downwardly and rearwardly, respectively, whereby the aforementioned denting can be avoided.

The folding of the baby carriage which is foldable widthwise generally, progresses together with an operation of folding the baby carriage lengthwise, whereby the seat core member and the backrest core member are so rotated that the upper seat surface and the front backrest surface approach each other.

When the seat core member and the backrest core member are tilted or rotated upwardly and forwardly respectively while being so rotated that the upper seat surface and the front backrest surface approach each other, however, the core members interfere with each other, and may hinder a smooth folding of the baby carriage.

SUMMARY OF THE INVENTION

An object of the present invention is to provide a seat for a baby carriage, having a head guard portion which can be reliably driven through a simple mechanism.

Another object of the present invention is to provide a seat for a baby carriage, which can reduce the aforementioned denting of a backrest portion.

Still another object of the present invention is to improve a baby carriage seat so that the respective core members that keep the shape or form of the seat and backrest will not hinder the folding of the baby carriage.

In one aspect of a seat for a baby carriage according to the present invention, an inclination angle fixing device comprises a backrest holding member which is rotatable about a first fixed journal axis (a first location forming a first journal at 62) which is different from a tilting axis (at a second location 42) of a backrest portion. The inclination angle fixing device is lockable in a plurality of positions at different angles relative to a horizontal plane.

The aforementioned backrest holding member is coupled to the backrest portion through a connecting mechanism including a slot extending along the longitudinal direction of the backrest portion and a pin (76) forming a third journal which is movably received in the slot, whereby the backrest portion is movable in a longitudinal direction parallel to the backrest length. When the inclination angle of the backrest portion is changed from a substantially upright position of the backrest portion, an operation of the backrest holding member is not transmitted to the backrest portion due to movement of the pin in the slot. However, an operation of the backrest holding member is transmitted to the backrest portion when the backrest portion is rotated from a most inclined position to an approximately upright position because now the pin engages an end wall of the slot, whereby the backrest portion can be moved lengthwise toward the seat portion.

A control mechanism for the tilting of a head guard comprises a control member (80) which is tilting about a second journal axis located in a fixed third location (79) spaced from the first journal axis (at 62) of the backrest holding member (61).

The aforementioned control member (80) is rotatably connected or journalled by a fourth journal (81) to a head guard portion, and the junction between the head guard portion and the control member is positioned on the back side of the head guard portion in such a position that a control force can be applied to the head guard portion for tilting the head guard portion.

As hereinabove described, the backrest portion is movable in a direction parallel to the length of the backrest portion within the limits of the slot of the connecting mechanism and as permitted by a belt (42) securing the backrest portion to the seat. However, as mentioned above, the junction between the head guard portion and the control member is positioned on the back side of the head guard portion in a position which permits tilting the head guard portion with the operation of the control member (80). When the backrest portion is tilted clockwise from substantially upright position (FIG. 6) to a substantially horizontal position (FIG. 7), the junction between the head guard portion and the control member is temporarily in a stationary position. In such a situation, the head guard portion is rotated into an upright position extending approximately perpendicularly to the plane of the backrest portion and from the upper end of the backrest portion.

When the backrest portion is rotated downwardly or tilted clockwise the pin is located against an end wall of the slot, whereby the operation of the backrest holding member (61) is transmitted to the backrest portion thereby moving the backrest portion into the most inclined, substantially horizontal position. The junction between the head guard portion and the control member (80) is substantially maintained at a constant position, whereby the head guard portion is rotated into an upright position from the upper end of the backrest portion, as described above when the backrest portion is tilted into the most inclined position.

When the inclination angle of the backrest portion is changed to bring the backrest from a substantially upright position to a somewhat inclined position intermediate between a substantially upright position and a substantially horizontal position, the inclination angle of the backrest holding member is also changed in response to the clockwise tilting into the intermediate position of the backrest. Further, the backrest tilting causes a displacement in the connected positions of the backrest portion and the backrest holding member in that the pin is moved in its slot, so that no operation of the backrest holding member is transmitted to the backrest portion as described above during clockwise tilting of the backrest (FIG. 6). When no operation of the backrest holding member is transmitted to the backrest portion, also no operation of the head guard control member (80) is transmitted to the head guard so that the head guard portion remains in a state substantially flush with the backrest portion when the backrest portion is in an intermediate state.

Thus, the baby carriage seat according to the present invention is so constructed and arranged that the head guard portion is kept in a state substantially flush with the backrest portion when the inclination angle of the backrest portion is changed to an intermediate position but the head guard portion is controlled by its control member (80) to assume an upright position extending from the upper end of the backrest portion when the inclination angle of the backrest is changed so that the backrest portion assumes the most inclined substantially horizontal state. Therefore, the head guard portion serves its original function of protecting a baby's head only when this function is necessary. This feature is an advantage because the head guard portion will not hang over the baby's head to give the baby an unpleasant feeling when the backrest portion is in its substantially upright position. When the seat takes the form of a bed, on the other hand, the head guard portion is positioned to face the top of the baby's head, whereby safety is much improved because the baby cannot slide head first out of the present seat.

As hereinabove described, the control mechanism for providing the head guard portion with a preferable operation does not employ any cam mechanism requiring relatively high working or assembling accuracy, whereby the present construction is simplified and an economical range for errors in working or assembling can be tolerated.

In another aspect of the present baby carriage seat, adjacent or neighboring plates of a plurality of backrest plates and of a plurality of head guard plates, are hinged with each other on the back sides thereof, respectively. Further, the respective backrest plates and the respective head guard plates, are hinged with each other on the front sides thereof, respectively.

According to the present invention, the plurality of backrest plates and the plurality of head guard plates are not simply lined up but hinged with each other in a backrest portion and in a head guard portion, respectively. Consequently, the neighboring plates of the backrest and of the head guard regulate their movements relative to each other when these plates are rotated or tilted about the respective hinging axes. When the backrest portion is most inclined so that the head guard portion assumes an upright position extending from the upper end of the backrest portion, a head guard core member stiffens the backrest and thereby increases the flexural strength of a backrest core member.

When the backrest portion is most inclined and a considerable part of a baby's weight is resting on the backrest portion, the above mentioned stiffening prevents denting of the backrest portion in the present baby carriage seat, whereby the seat is comfortable for the baby to sit on, and the baby is protected against unnatural deformation of the spinal cord.

According to the present invention the neighboring backrest plates are hinged to each other and the neighboring head guard plates are also hinged to each other on the respective back sides thereof, whereby the cross-directional central parts of the backrest portion and of the head guard portion can be readily folded to project forwardly while a high resistance is provided against folding in the opposite direction. This mutual hinging also contributes to stiffening of the backrest portion thereby preventing denting when a baby's weight is resting on the present seat. This mutual stiffening due to hinging of the plates is effective in all positions of the backrest portion, namely in the substantially upright state, in an intermediate state, and in the substantially horizontal state.

In order to more completely effectuate the aforementioned advantage, the plurality of backrest plates and the plurality of head guard plates preferably have longitudinal edge surfaces arranged so that neighboring edge surfaces abut each other when these plates are substantially flush with each other.

Further, according to the present invention, the respective backrest plates and the respective head guard plates are hinged with each other on the front sides thereof, whereby the head guard portion can be smoothly rotated into its upright position extending from the upper end of the backrest portion.

In still another aspect of a seat for a baby carriage according to the present invention, the present seat comprises a pair of belt mounting members which are positioned on both sides of the baby carriage seat to approach each other in response to folding the baby carriage widthwise, and a flexible belt which extends across between the pair of belt mounting members whereby belt end portions are mounted on the belt mounting members, respectively. The lower end of a backrest core member is held and hinged by this belt.

In an open state of the baby carriage, the belt is maintained in a relatively strained or taut state. Thus, the lower end of the backrest core member is kept in a stable position.

When the baby carriage is folded, on the other hand, the pair of belt mounting members approach each other, whereby the spacing between the belt mounting members is reduced. Thus, the belt is so loosened that the lower end of the backrest core member is readily movable. When a seat core member and the backrest core member are tilted upwardly and forwardly, respectively while these core members are so rotated that the upper surface of the seat core member and the front surface of the backrest core member approach each other and the core members contact each other, the backrest core member can be readily moved to avoid interference with the seat core member due to flexibility of the belt.

According to the present invention, therefore, the baby carriage can be folded into a compact unit.

According to the present invention, three seat plates are preferably hinged to each other between neighboring seat plates on the lower or normally downwardly facing sides of the seat plates which have edge surfaces abutting against each other between neighboring plates when the plates are substantially flush with each other. Further, three backrest plates are also preferably hinged with each other between neighboring backrest plates on the back sides thereof, while having edge surfaces abutting each other when the backrest plates are substantially flush with each other. Due to such a structure, it is possible to obtain a seat for a baby carriage which can reliably avoid the aforementioned denting when a baby's weight rests on the seat while enabling an upward and frontward tilting of the seat core member and the backrest core member.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
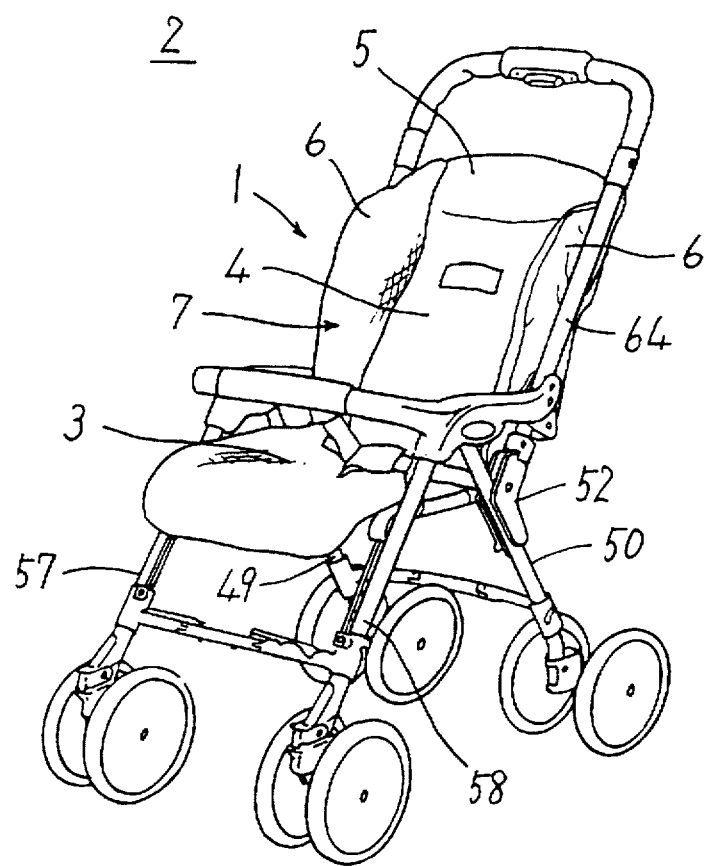
FIG. 1 is a perspective view showing the overall structure of a baby carriage 2 comprising a seat 1 according to one embodiment of the present invention with a backrest portion shown in its substantially upright position.
Figure 2:
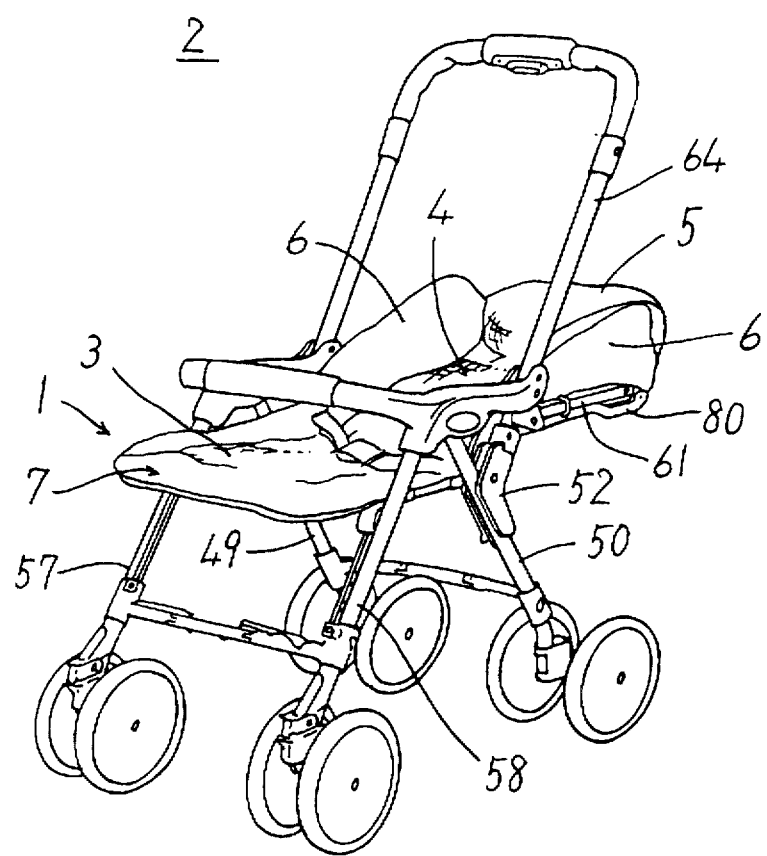
FIG. 2 is a perspective view showing the carriage of FIG. 1, with the backrest portion 4 in its most inclined state.

FIGS. 1 and 2 are perspective views showing a baby carriage 2 comprising a seat 1 according to one embodiment of the present invention. The seat 1 comprises a seat portion 3, a backrest portion 4 and a head guard portion 5. The backrest portion 4 is shown in its substantially upright position extending from a rear edge of the seat portion 3. The inclination angle of the backrest portion 4 is changeable as will be described in more detail below. The head guard portion 5 is rotatably connected or hinged to the upper end of the backrest portion 4 by first hinges 26, 27, 28 shown in FIG. 6. The backrest has a pair of side guards 6 one of which extends laterally on each side of the backrest portion 4. Referring to FIG. 1, the backrest portion 4 is in a substantially upright state. In this state the head guard portion 5 is substantially flush with the backrest portion 4 so that in this upright state the head guard does not cover a baby's head. Referring to FIG. 2, the backrest portion 4 is in a most inclined state, and the head guard portion 5 is now in an upright state extending from the upper end of the backrest portion 4.

Figure 3:
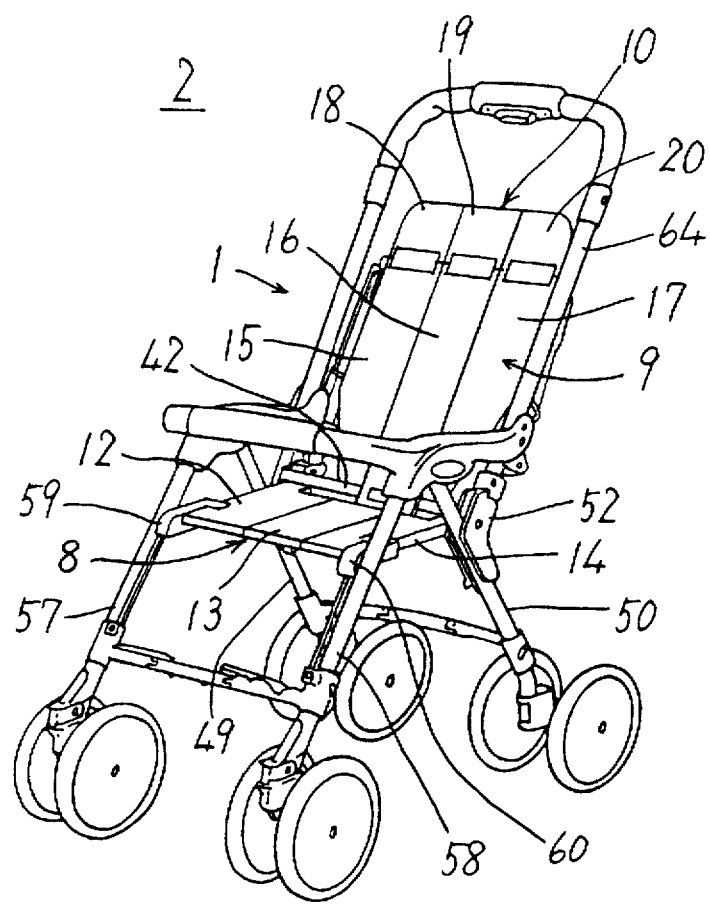
FIG. 3 is a perspective view corresponding to FIG. 1, showing the baby carriage 2 without a cover sheet for the seat 1.
Figure 4:
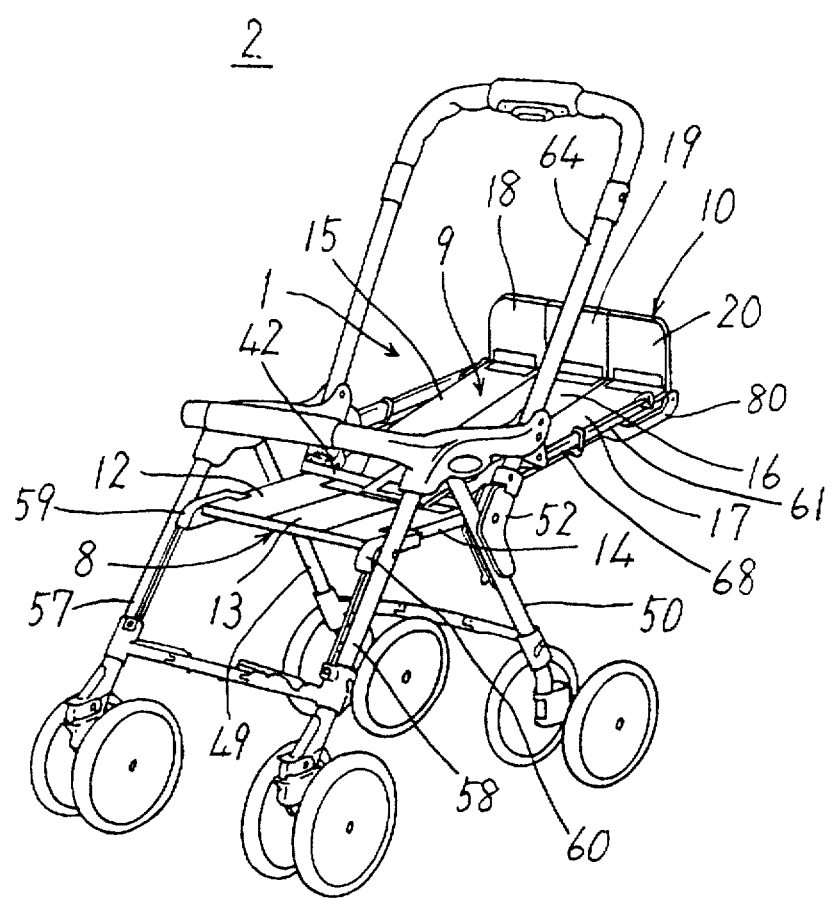
FIG. 4 is a perspective view corresponding to FIG. 2, showing the baby carriage 2 without the cover sheet.
Figure 5:
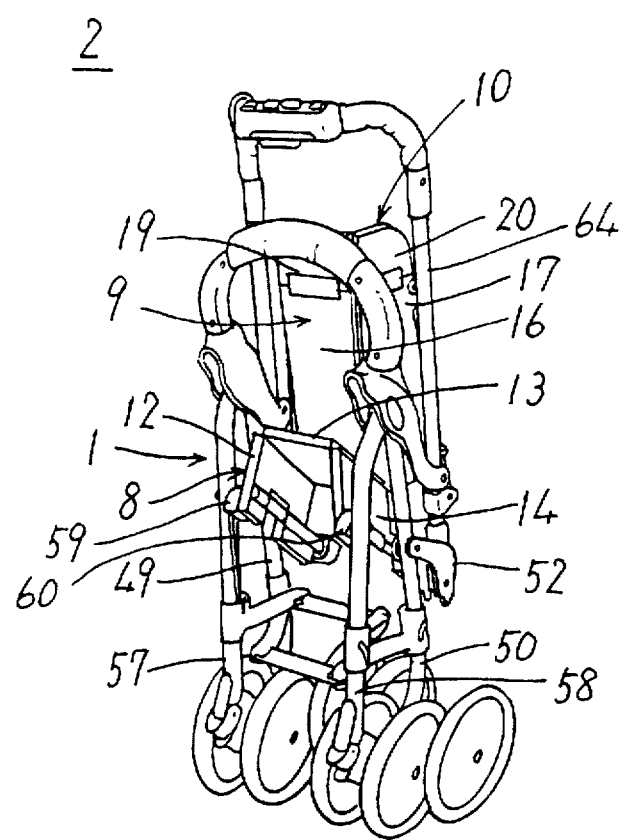
FIG. 5 is a perspective view showing a folded state of the baby carriage 2 of FIG. 1, without the cover sheet 7.

The surface of a seat core structure of the seat 1 is normally covered by a flexible cover sheet 7 of cloth, for example. Preferably, a proper cushion material is positioned between the cover sheet 7 and the core structure. FIGS. 3 and 4 show the baby carriage 2 of FIGS. 1 and 2, but without the cover sheet 7. FIG. 5 shows a folded state of the baby carriage 2, from which the cover sheet 7 has been removed.

The seat portion 3, the backrest portion 4, the head guard portion 5 and the side guard portions 6 comprise a seat core member 8, a backrest core member 9, a head guard core member 10 and side guard core members 11 which are in the form of plates made of relatively rigid materials respectively. The portions 3, 4, 5, and 6 are kept dimensionally stable by these core members 8 to 11, respectively. The side guard core members 11, which are not shown in FIGS. 3 to 5, are illustrated by phantom lines in FIGS. 13 to 18.

Comparing FIGS. 3 and 5 with each other, it is understood that the baby carriage 2 is foldable widthwise as shown in FIG. 5. In order to allow folding the baby carriage 2 widthwise, the seat core member 8, the backrest core member 9 and the head guard core member 10 have at least two, preferably three, seat plates 12 to 14, three backrest plates 15 to 17 and three head guard plates 18 to 20, whereby the core members are divided by pairs of parting lines extending in parallel with the side surfaces of the baby carriage 2, respectively. FIGS. 6 to 11 show the seat core member 8, the backrest core member 9 and the head guard core member 10 in detail.

Figure 6:
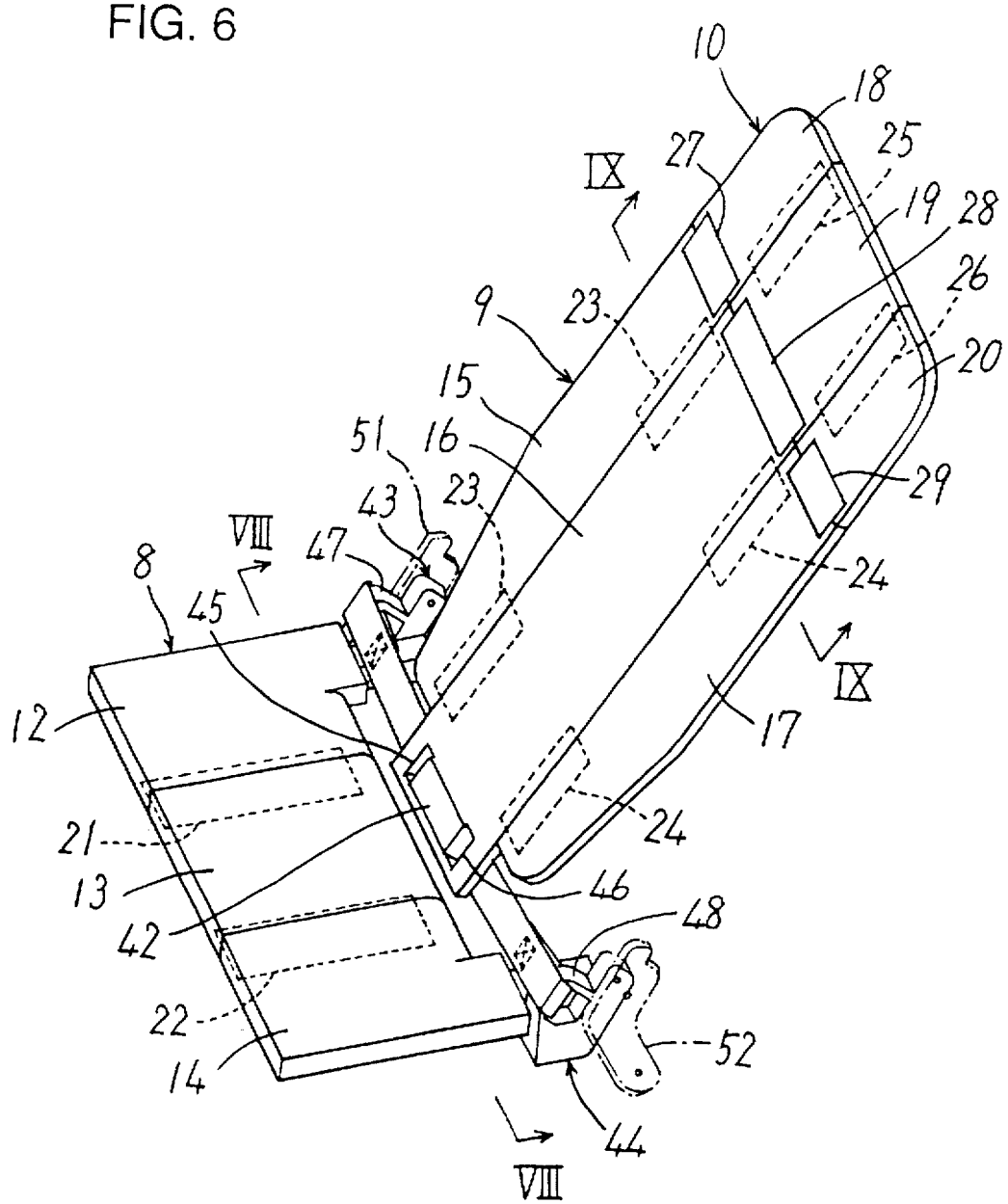
FIG. 6 is a perspective view of the core structure of the seat 1 shown in FIG. 3 with the backrest in a substantially upright position.
Figure 7:
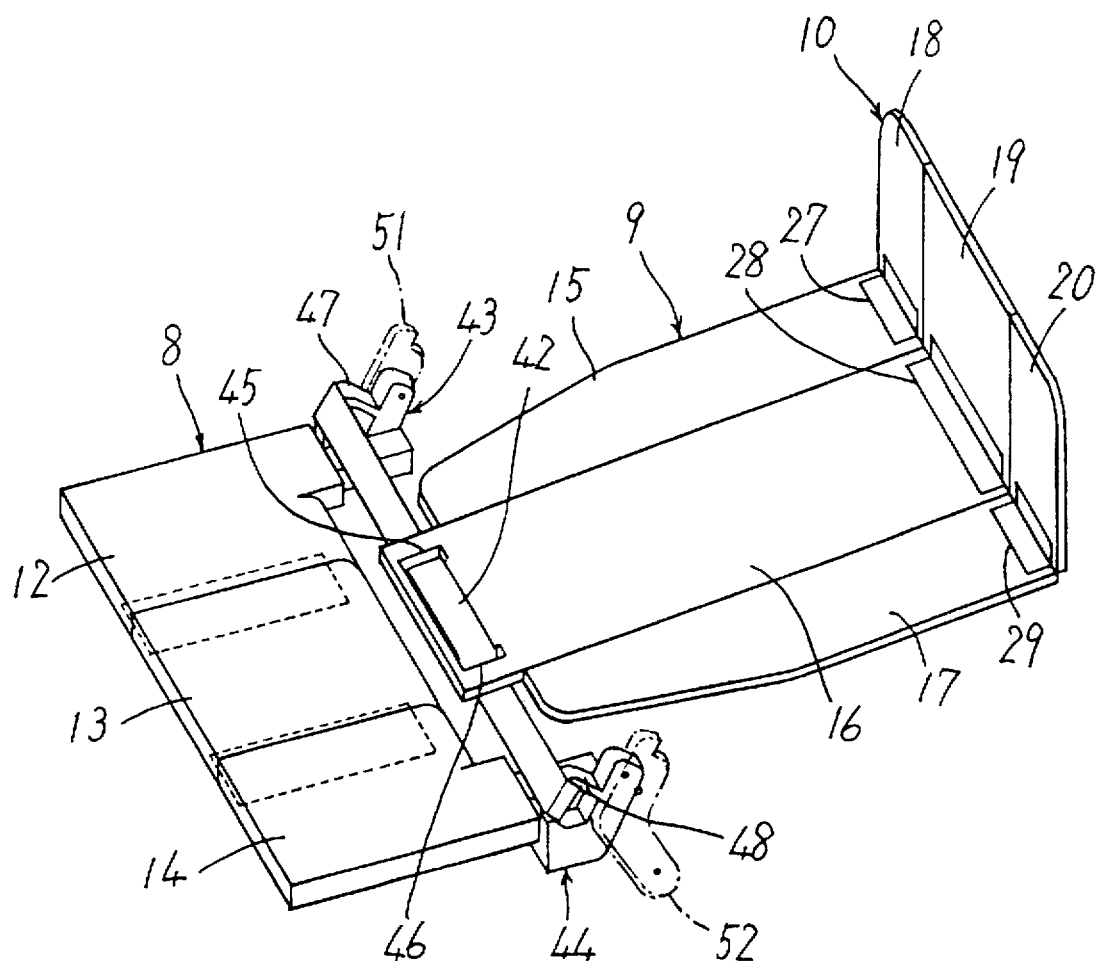
FIG. 7 is a perspective view of the core structure of the seat 1 shown in FIG. 4 with the backrest in a substantially horizontal position.
Figure 8:
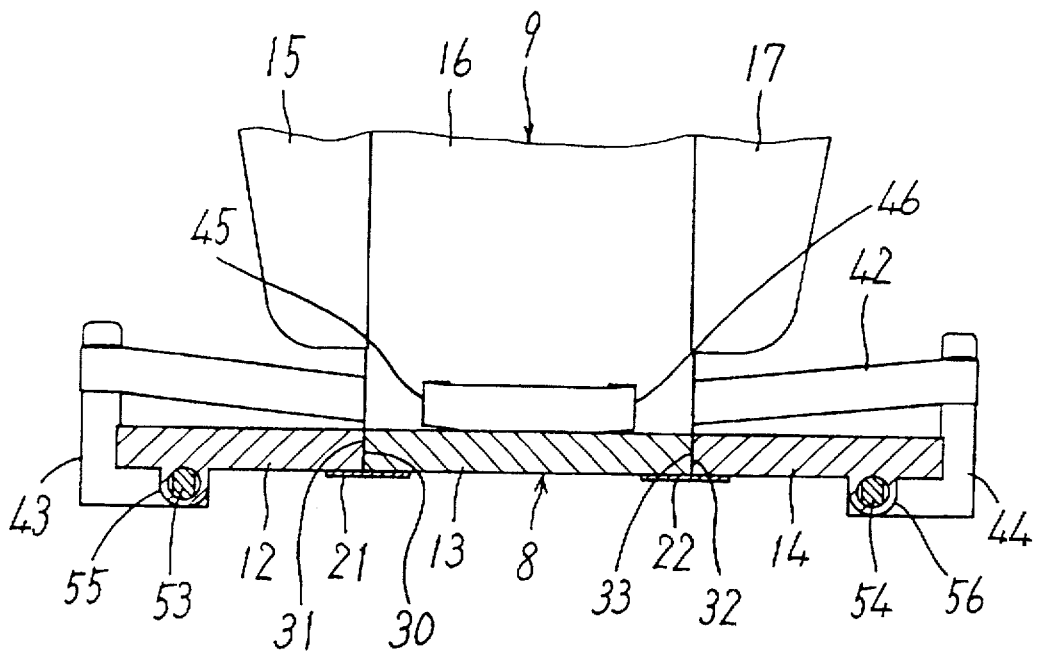
FIG. 8 is a sectional view taken along the line VIII—VIII in FIG. 6.
Figure 9:
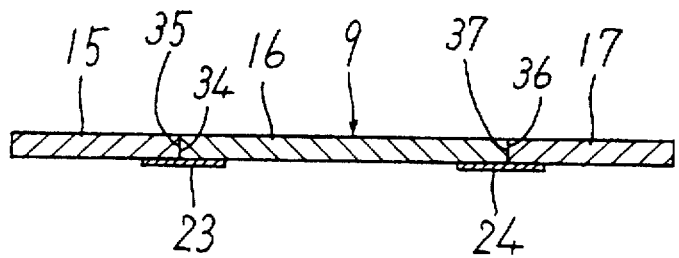
FIG. 9 is a sectional view taken along the line IX—IX in FIG. 6.

FIGS. 6 and 7 show states corresponding to those shown in FIGS. 3 and 4, respectively. FIGS. 8 and 9 are sectional views taken along the lines VIII—VIII and IX—IX in FIG. 6, respectively.

Figure 10:
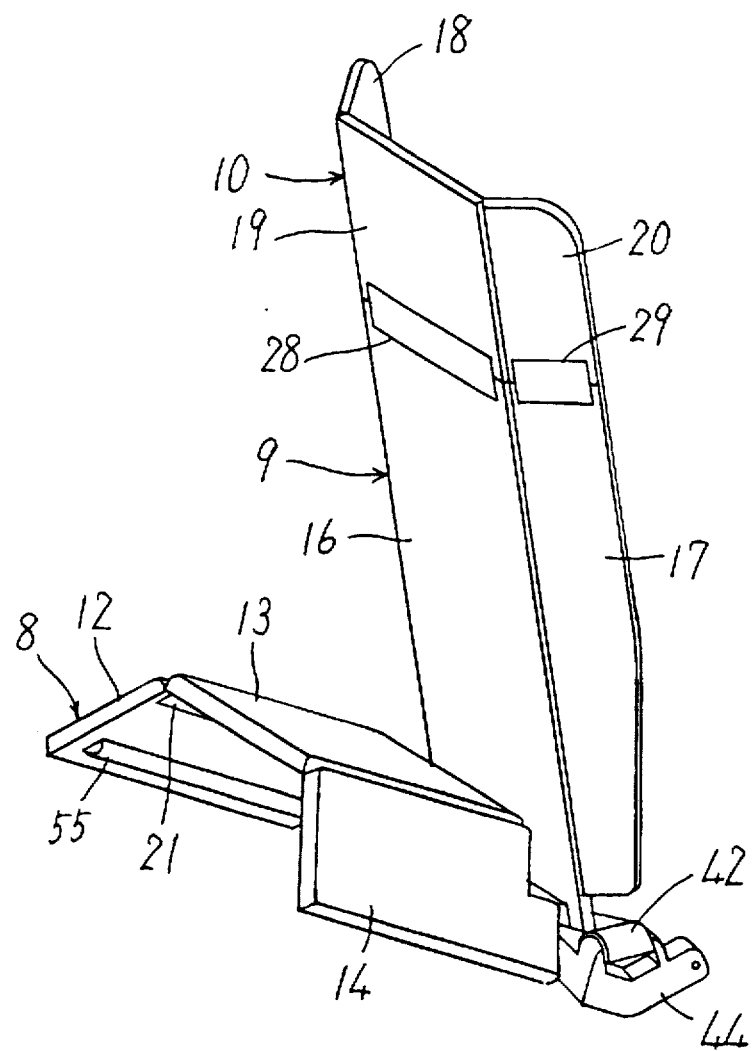
FIG. 10 is a perspective view of the structure shown in FIG. 6, but in an intermediate state of a folding operation.
Figure 11:
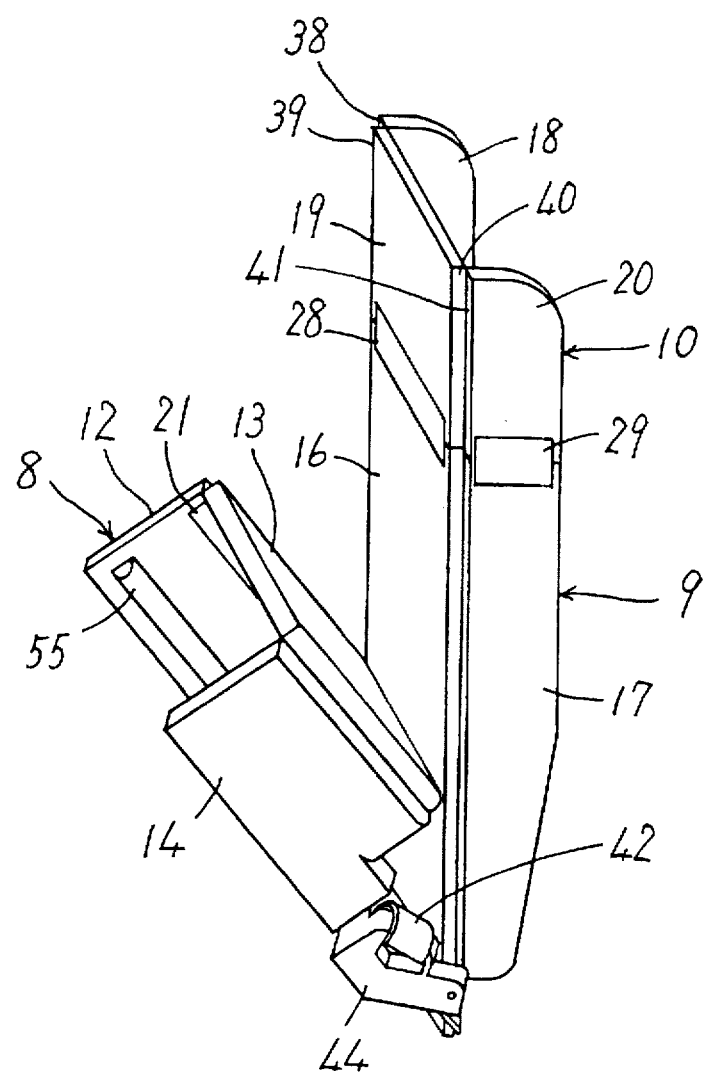
FIG. 11 is a perspective view of the structure for the baby carriage 2 shown in FIG. 5.

FIGS. 10 and 11 illustrate how the seat core member 8, the backrest core member 9 and the head guard core member 10 assume configurations in response to folding the baby carriage 2. FIG. 10 shows the core members 8 to 10 in an intermediate folding position, while FIG. 11 shows the position after folding of the baby carriage 2 corresponding to the state shown in FIG. 5

The three seat plates 12 to 14, the three backrest plates 15 to 17, and the three head guard plates 18 to 20 are hinged to each other, respectively. Further, the backrest plates 15 to 17 are hinged to the head guard plates 18 to 20. As best seen in FIG. 6, the plates 12 to 20 are hinged to each other by hinge elements 21 to 29 made of a repeatedly bendable flexible sheet material, for example. The hinge elements 21 to 29 are applied to prescribed positions by a method such as adhesion, molding, or welding. For example, when the seat plates 12 to 14, the backrest plates 15 to 17, and the head guard plates 18 to 20 are produced by molding resin, the hinge elements 21 to 29 may be inserted in the mold assembly, so that the same are applied to the plates 12 to 20 simultaneously with the molding.

The hinge elements 21 and 22 are positioned on the back sides of the seat plates 12 to 14, while the hinge elements 23 and 24 are positioned on the back sides of the backrest plates 15 to 17. The hinge elements 25 and 26 are positioned on back sides of the head guard plates 18 to 20. However, the hinges 27 to 29 connecting the backrest and head guard to each other are positioned on front sides of the backrest plates 15 to 17 and of the head guard plates 18 to 20. Hinges 27, 28, 29 form a common hinging axis 27', 28', 29' extending perpendicularly to the hinging axes of hinges 23, 24, 25, 26.

The seat core member 8 can be tilted upwardly or clockwise in FIG. 6 to assume positions shown in FIGS. 10 and 11, while the backrest core member 9 and the head guard core member 10 can be tilted forwardly or counterclockwise in FIG. 6 due to a flexible belt 42. Further, the head guard core member 10 can be tilted to assume an upright position relative to the upper end of the backrest core member 9, as shown in FIG. 7 under the control of a head guard control mechanism 80. The belt 42 and the head guard control mechanism will be described in more detail below.

Referring to FIG. 8, when the seat plates 12 to 14 are substantially flush with each other, the edge surfaces 30 and 31 of neighboring seat plates 12 and 13 abut each other. Similarly, seat plates 13, 14 abut each other along edges 32, 33. Referring to FIG. 9, neighboring backrest plates 15, 16 abut along edges 34, 35 and backrest plates 16 and 17 abut along edges 36, 37. The just described abutting normally keeps the seat core 8 and the backrest 9 in a plane state when the seat plates 12 to 14 are substantially flush with each other and when the backrest plates are also substantially flush with each other thereby stiffening the seat and backrest against a force directed downwardly in FIGS. 8 and 9. Thus, the seat portion 3 is not dented downwardly in its central part by the weight of a baby sitting on the seat 1. Similarly, the backrest does not dent backwardly. As a result, the baby is not unnaturally fatigued.

Referring to FIG. 11, the head guard core member 10 also has a structure similar to the above described seat and backrest structures. When the head guard plates 18 to 20 are substantially flush with each other, edge surfaces 38 and 39 of head guard plates 18 and 19 abut with each other and edge surfaces 40 and 41 of head guard plates 19 and 20 also abut with each other.

Such a structure of maintaining a plane state by abutting end edge surfaces is preferably also employed between the backrest plates 15 to 17 and the head guard plates 18 to 20, for keeping the backrest core member 9 and the head guard core member 10 in a state substantially flush with each other as shown in FIG. 6, whereby the head guard core member 10 can be tilted clockwise from the position of FIG. 7 into the position of FIG. 6, but not any further in the clockwise direction in FIG. 6.

When the backrest core member 9, is in the most inclined state as shown in FIGS. 2, 4 and 7, however, a considerable part of the baby's weight is applied to the backrest core member 9 as compared to the state when the backrest is in a substantially upright state. Thus, the backrest portion 4 could be dented in its central part. However, according to this embodiment, such denting of the backrest portion 4 is substantially avoided by the presence of the head guard core member 10 which stiffens the backrest when the head guard is in the position of FIG. 7.

As clearly shown in FIG. 7, the head guard core member 10 is in an upright position extending from the upper end of the backrest core member 9 which is in its most inclined state. In its upright position the head guard 10 stiffens the backrest 9 thereby increasing the flexural strength of the backrest core member 9. Consequently, denting of the backrest portion 4 is avoided, whereby the seat 1 is comfortable for the baby to rest on, while the baby can be protected against unnatural deformation of the spinal cord.

In response to folding the baby carriage 2, the seat core member 8 and the backrest core member 9 are tilted upwardly and forwardly respectively, whereby the upper surface of the seat core member 8 and the front surface of the backrest core member 9 approach each other, as successively shown in FIGS. 10 and 11. As shown in FIG. 10, the seat core member 8 and the backrest core member 9 already bear against each other. Therefore, the fully folded state of the baby carriage 2 shown in FIG. 5 could not be attained unless further folding as shown in FIG. 11 is made possible.

To solve this problem, the lower end of the central backrest plate 16 forming part of the backrest core member 9 is held by the above mentioned flexible belt 42 according to this embodiment of the invention. The belt 42 extends across the seat 8 as seen in FIG. 8 and is held in place by a pair of belt mounting members 43 and 44 forming with the belt an articulation structure. More specifically, the belt 42 successively passes through two slots 45 and 46 which are provided in the lower end of the backrest plate 16, thereby holding the backrest plate 16. Further, the belt mounting members 43 and 44 are provided with rings 47 and 48 seen in FIG. 7. The ends of the belt 42 have loops held by the rings 47, 48.

The belt mounting members 43 and 44 are positioned on both sides of the baby carriage 2 and approach each other in response to folding the baby carriage 2 widthwise. These belt mounting members 43 and 44 are mounted on angle members 51 and 52 which are attached to rear legs 49 and 50 of the baby carriage 2, respectively. The belt mounting members 43 and 44 are also mounted to shafts 53 and 54, respectively, as shown in FIG. 8. The shafts 53 and 54 are received in bearings 55 and 56 which are secured to the lower surfaces of the seat plates 12 and 14, respectively, to be rotatable in the bearings 55 and 56 about the axes thereof, respectively. The front ends of the shafts 53 and 54 are held by brackets 59 and 60 which are mounted on front legs 57 and 58 of the baby carriage 2, respectively, as seen in FIG. 5.

In an open, unfolded state of the baby carriage 2, the belt 42 is kept in a taut condition. Therefore, the lower end of the backrest core member 9 is maintained in a stable position.

When the baby carriage 2 is folded, on the other hand, the pair of belt mounting members 43 and 44 approach each other. Thus, the seat core member 8 and the backrest core member 9 can be tilted upwardly and forwardly, respectively, while the belt 42 is loosened. During tilting the upper surface of the seat core member 8 and the front surface of the backrest core member 9 approach each other. When the seat core member 8 contacts the backrest core member 9, the backrest core member 9 is displaced since the belt 42 is flexible thereby avoiding any interference with the seat core member 8 to permit a full folding.

In order to allow the aforementioned relative movements of the seat member 8 and the backrest core member 9, the cover sheet 7 is flexible in the boundary area between the seat portion 3 and the backrest portion 4.

Mechanisms for tilting the backrest core member 9 and the head guard core member 10 shown in FIGS. 6 and 7, respectively, will now be described with reference to FIGS. 12 to 18.

The elements shown in FIGS. 12 to 18 are symmetrically provided on both sides of the baby carriage 2. However, the following description refers only to the elements provided on one side, since the description of one side is equally applicable to the other side.

A backrest holding member 61 functions as an inclination angle fixing device for locking the backrest portion 4 in a position with a changed inclination angle. The backrest holding member 61 is mounted on an adjusting bracket 63 to be rotatable about a journal pin 62 forming a first journal. The adjusting bracket 63 is mounted on a push rod 64 of the baby carriage 2. The first journal or journal pin 62 is located in a position which is different from a second pivot axis formed by the belt 42 between the belt holding rings 47, 48 as seen in FIGS. 6 and 7 for the backrest portion 4.

Figure 16:
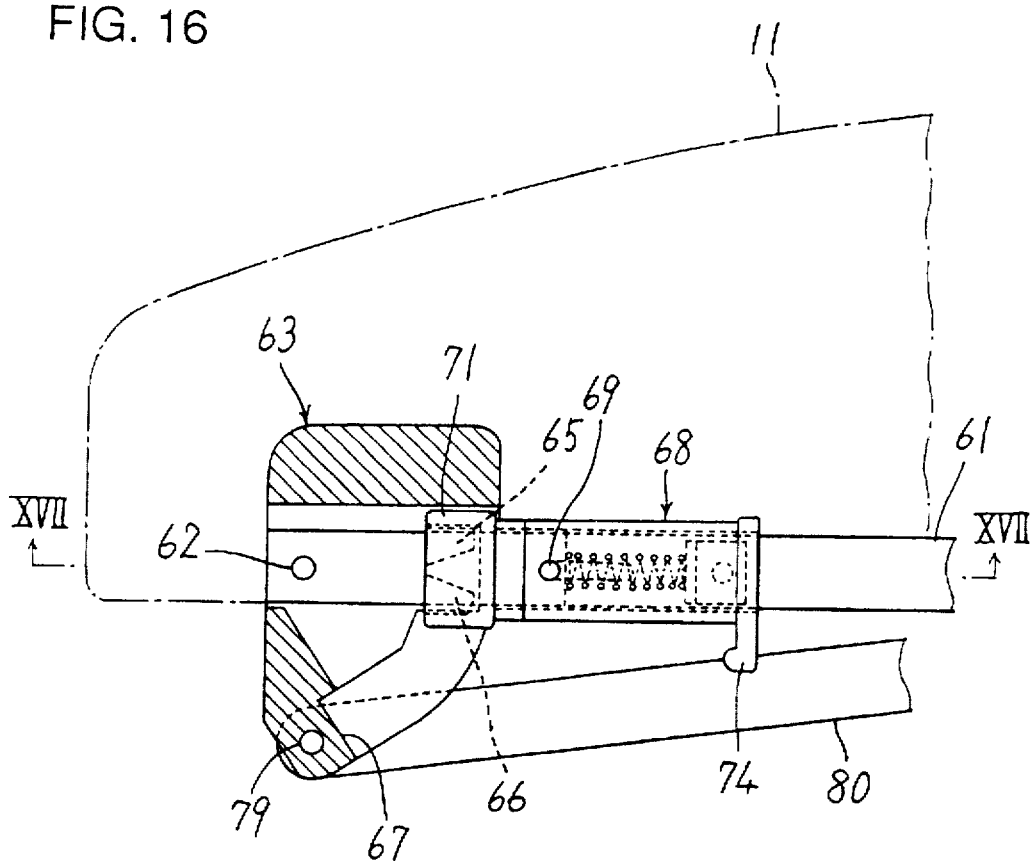
FIG. 16 is a side elevational view partly in section showing in more detail on an enlarged scale a backrest position adjustment mechanism and a head guard control member (80) also shown in FIG. 13.

As shown in FIG. 16, the adjusting bracket 63 is provided with a plurality of engaging projections 65 and 66 and an engaging stop 67.

Figure 13:
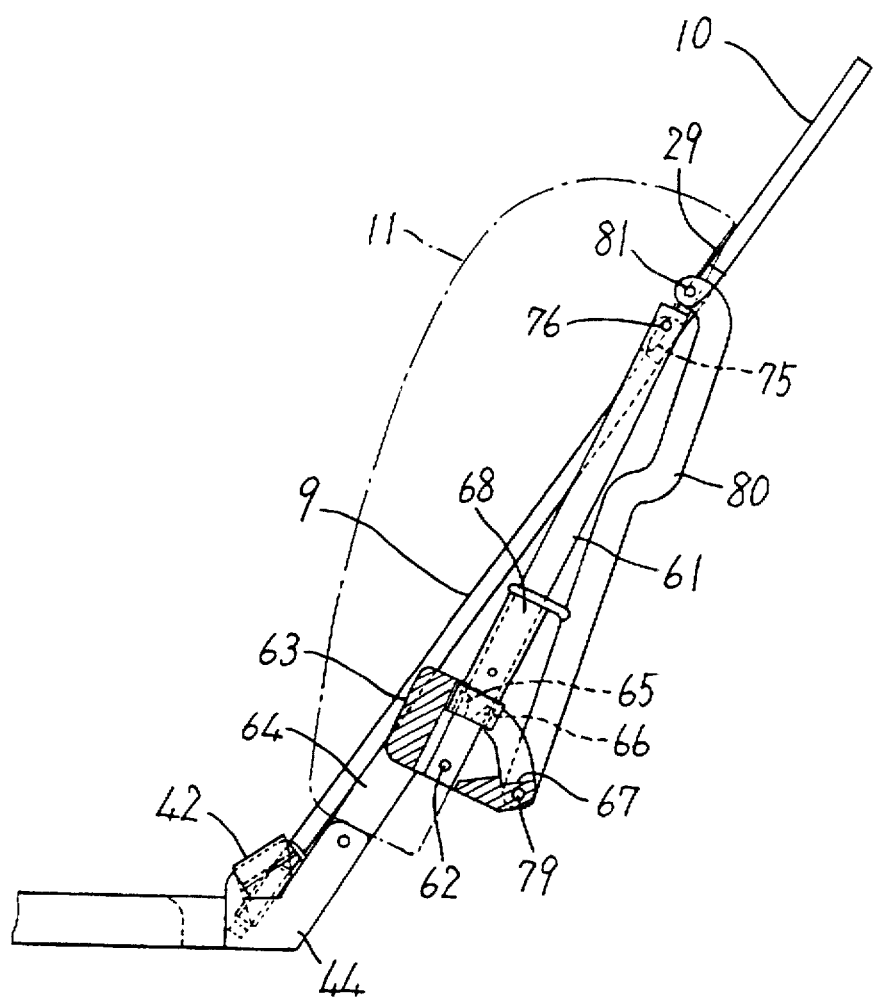
FIG. 13 is a side elevational view showing a mechanism for changing the inclination angle of a backrest core member 9 shown in a substantially upright state.
Figure 14:
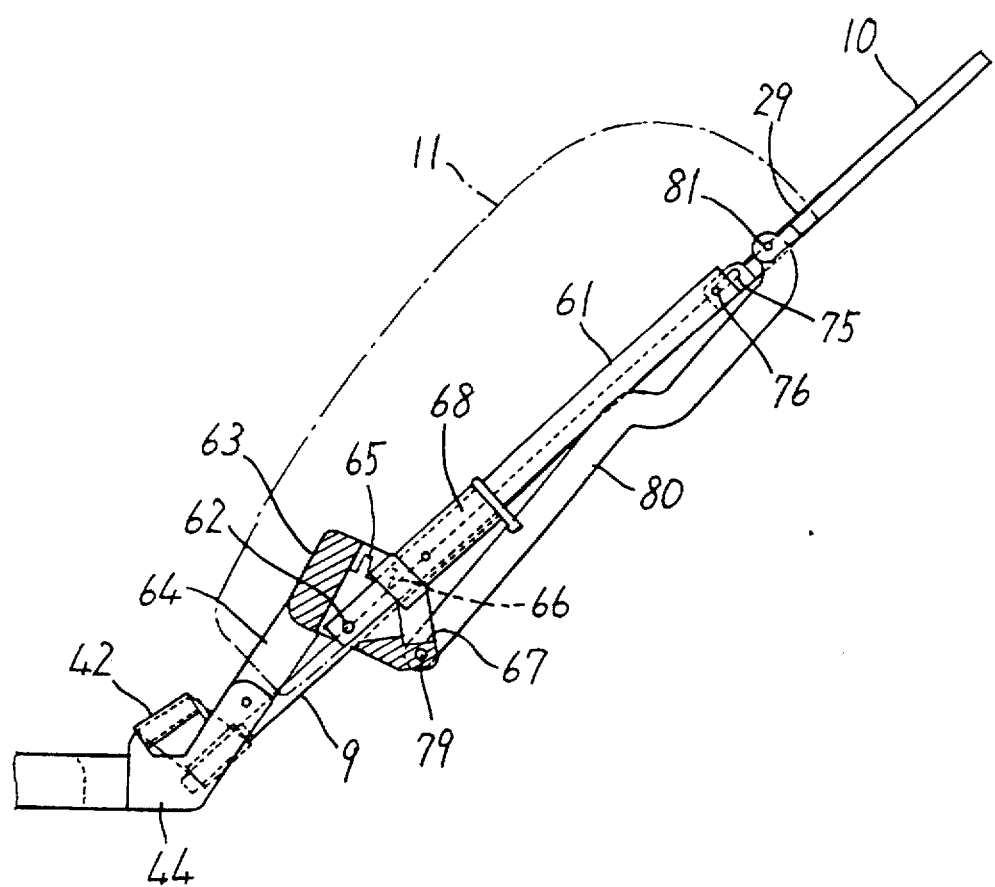
FIG. 14 is a side elevational view similar to FIG. 13, but showing the backrest core member 9 in an intermediately inclined state.
Figure 17:
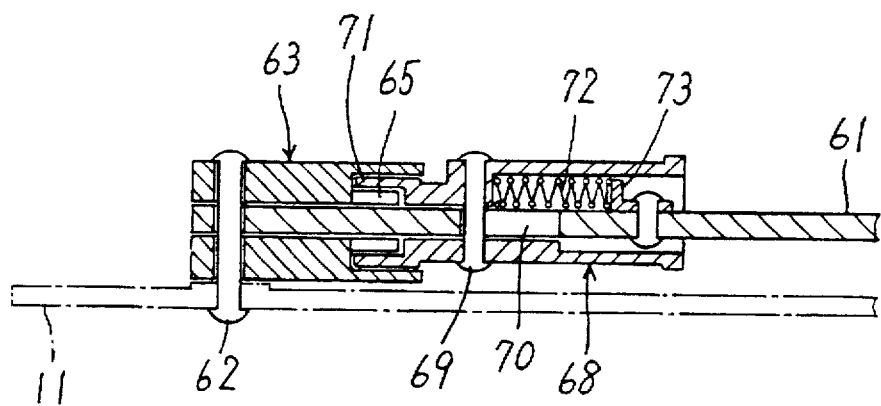
FIG. 17 is a sectional view taken along the line XVII—XVII in FIG. 16.

An engaging sleeve 68 is slidably mounted on the backrest holding member 61 to be movable along its longitudinal axis. FIG. 17 shows how the moving range of the engaging sleeve 68 is defined by a pin 69 secured to the engaging sleeve 68 and by a longitudinal guide slot 70 which is provided in the backrest holding member 61. The pin 69 is limited in its movements by the length of the slot 70. The engaging sleeve 68 is provided on its one end with an engaging portion 71, which selectively engages the projection 65 or 66 as seen in FIGS. 13 and 14. A spring 72 is arranged between a part of the engaging sleeve 68 and a contact member 73 which is fixed to the backrest holding member 61, for urging the engaging sleeve 68 with its engaging portion 71 into engagement with one or the other of the projections 65 or 66. The engaging sleeve 68 is provided on another end with an operating handle 74 for moving the engaging sleeve 68 to separate the engaging portion 71 from the engaging projections 65 or 66.

Figure 15:
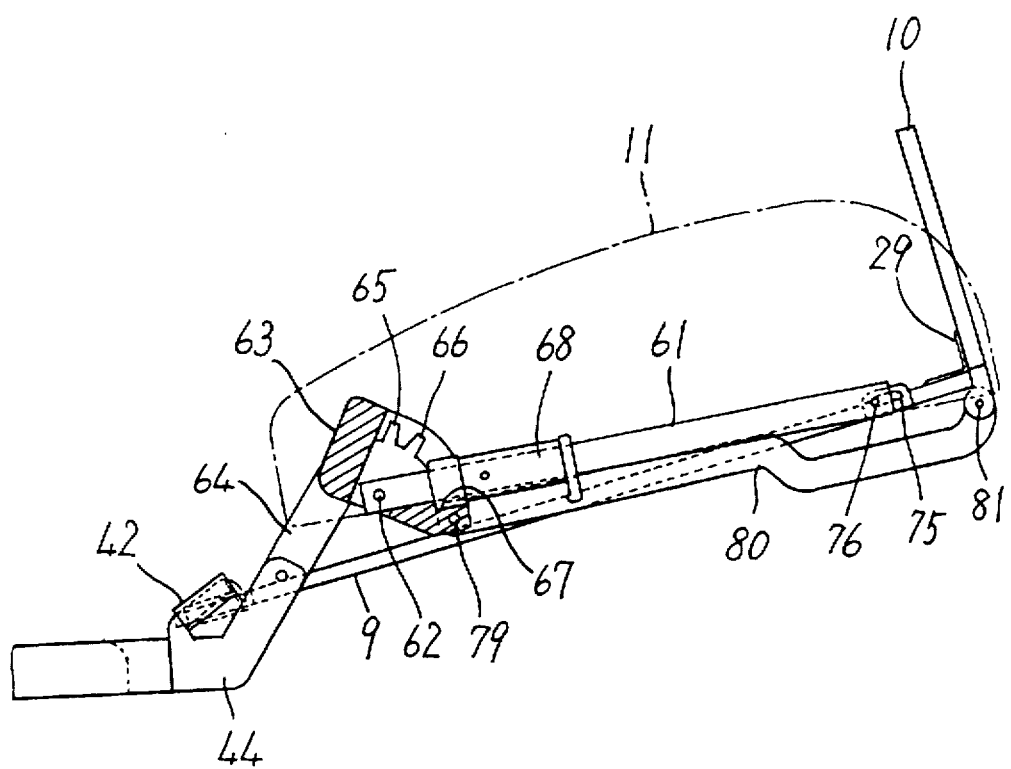
FIG. 15 is a side elevational view similar to FIG. 13, showing the backrest core member 9 which is in a most inclined approximately horizontal state.

The operating handle 74 is operated manually for moving the engaging sleeve 68 against the elastic biasing force of the spring 72 thereby separating the engaging portion 71 from the engaging projection 65 or 66, so that the backrest holding member 61 is rotatable about its first journal or journal pin 62. When the engaging portion 71 engages with the engaging projection 65 as shown in FIG. 16, the backrest holding member 61 is fixed in the most upright position, as shown in FIG. 13. When the engaging portion 71 engages with the engaging projection 66, on the other hand, the backrest holding member 61 is fixed in an intermediate position as shown in FIG. 14. When the engaging sleeve 68 comes into contact with the engaging stop 67 the backrest holding member 61 is fixed in the most inclined state, as shown in FIG. 15.

The lower end portion of the aforementioned side guard core member 11 is shown in FIGS. 16 and 17 in phantom lines. This lower end portion of the side guard core member 11 is held in place by the first journal or journal pin 62.

Figure 18:
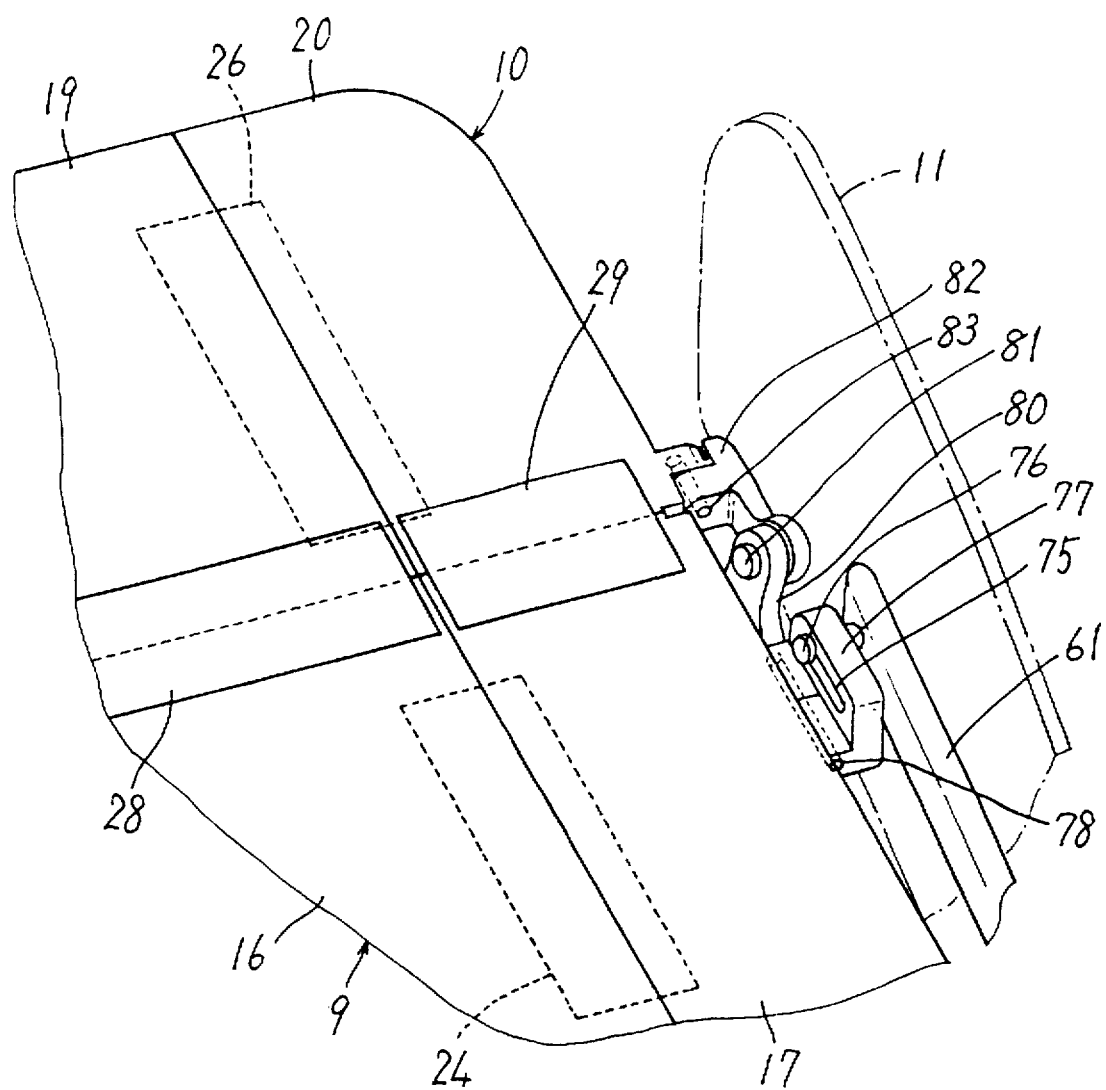
FIG. 18 is a perspective view showing the connection between an upper end of the backrest and a backrest holding member (61) with the backrest in its substantially upright state shown in FIG. 13 and also showing a coupling between the head guard control member (80) and the head guard.

FIG. 18 shows the upper end of the backrest holding member 61. The backrest holding member 61 is connected to the backrest portion 4 through a connecting mechanism including a combination of a bracket 77 with a slot 75 extending along the longitudinal direction of the backrest portion 4 and a guide pin or journal 76 which is movably received in the slot 75 and forms a movable third journal. The guide pin 76 is secured to the upper end of the backrest holding member 61. The slot 75 is formed in the connecting bracket 77 which is mounted to a side portion of the backrest plate 17 by a hinge pin 78 so that the bracket 77 is rotatable about the hinge pin 78. The rotation about the hinge pin 78 enables the aforementioned folding of the backrest core member 9 shown in FIGS. 10 and 11.

The above described connecting mechanism may be modified by providing the slot 75 in the upper end of the backrest holding member 61 and securing the guide or journal pin 76 to the backrest portion 4.

As shown by phantom lines in FIG. 18, the upper end of the side guard core member 11 is positioned between the backrest holding member 61 and the connecting bracket 77, and held by the journal pin 76. Thus, the side guard core member 11 operates integrally with the backrest holding member 61.

As shown in FIGS. 12 to 16, a control member 80 is mounted to rotate about a journal pin 79 forming a second journal or pivot axis which is positioned in the adjusting bracket 63 spaced behind the first journal pin 62 as seen in FIGS. 12 to 15 when the push rod 64 is in its normal orientation. In FIG. 16 the second journal pin 79 merely appears below the journal pin 62 because of the first different orientation of FIG. 16 relative to FIGS. 12 to 15.

FIG. 18 shows the upper end of the head guard control member 80. This control member 80 is rotatably connected to the head guard portion 5 through a pivot or journal pin 81 forming a fourth journal whereby the control member 80 is rotatably connected to a connecting bracket 82 which is mounted on a side portion of the head guard plate 20 of the head guard core member 10 of the head guard portion 5. The connecting bracket 82 is connected to the head guard plate 20 through a journal pin 83, whereby the connecting bracket 82 is rotatable about the pin 83 with respect to the head guard plate 20. This rotation allows the folding of the head guard core member 10, as shown in FIGS. 10 and 11.

Figure 12:
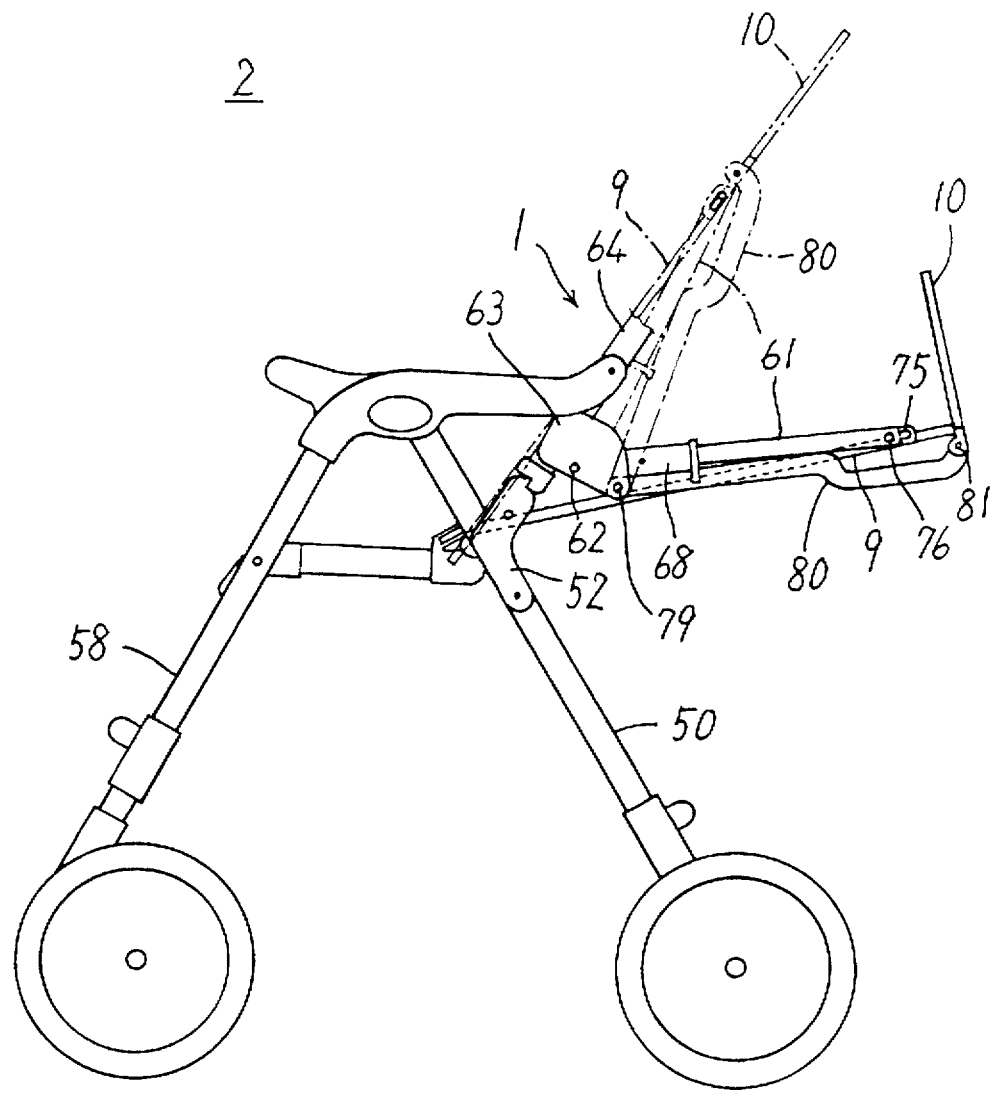
FIG. 12 is a side elevational view showing the baby carriage 2 of FIG. 4 with unimportant elements omitted.

The junction between the head guard portion 5 and the control member 80 through the fourth journal pin 81 is so positioned on the back side of the backrest portion 4 relative to the hinge axis 28', 29' of the hinge connection between the head guard portion 5 and the backrest portion by the hinge elements 27 to 29, that the head guard can be tilted between the two positions shown in FIG. 12 in response to a tilting of the backrest due to the journalling of the lower end of the control member 80 to the bracket 63 to which the backrest is also connected through its holding member 61.

The backrest portion 4, more specifically the backrest core member 9, is held by the belt 42 with respect to the body of the baby carriage 2. Additionally, the core member 9 is held in place by the connecting mechanism including the bracket 77 with the slot 75 and the guide or journal pin 76 forming a third journal which secure the backrest to the backrest holding member 61, whereby the backrest holding member is movable along its longitudinal direction within the limits defined by the length of the slot 75.

When the backrest core member 9 is in the substantially upright state as shown in FIG. 13, the head guard core member 10 and the backrest core member 9 are substantially flush with each other. Further, when the backrest is in the substantially upright state the guide or journal pin 76 is positioned at one end namely the upper end of the slot 75 bearing against the upper slot end wall.

When the backrest core member 9 is brought into the intermediate, inclined state as shown in FIG. 14, the control member 80 moves the backrest core member 9 upwardly through the head guard core member 10. In other words, the backrest core member 9 is moved up in a direction parallel to its longitudinal direction. At this time, the pin 76 is merely moved toward the other end, i.e., the lower end of the slot 75, and no operation of the backrest holding member 61 is transmitted to the backrest core member 9. Thus, the head guard core member 10 is kept in the state substantially flush with the backrest core member 9.

However, when the backrest core member 9 is brought into the most inclined state as shown in FIG. 15, the respective movement or operation of the backrest holding member 61 is transmitted to the backrest core member 9 since the third journal pin 76 is already positioned against the lower end wall of the slot 75, whereby the backrest core member 9 is further moved toward the seat portion. At this time, the journal pin 81 forming a fourth journal which is positioned on the back side of the backrest portion 4 outside the hinge axis 28', 29' of the hinge elements 27 to 29, is kept in this position by the control member 80, whereby the downward tilting of the backrest 4 causes the head guard core member 10 to rotate counterclockwise into the upright state extending substantially at a right angle from the upper end of the backrest core member 9. Thus, the head guard portion 5 is moved into an upright position from the upper end of the backrest portion 4, as shown in FIGS. 12 or 15.

When the baby carriage seat 1 is returned counterclockwise from the inclined position shown in FIG. 15 to the substantially upright position shown in FIG. 13, the head guard core member 10 assumes a position substantially flush with the backrest core member 9 under the control of the control member 80 as shown in FIG. 13.

When the baby carriage seat 1 is returned counterclockwise only to the intermediate position shown in FIG. 14 from that shown in FIG. 15, however, the head guard core member 10 is inevitably kept in the upright state to extend at a right angle from the upper end of the backrest core member 9 although the backrest core member 9 is now in an intermediate, inclined state. Therefore, in order to bring the head guard core member 10 into the state substantially flush with the backrest core member 9 also in the intermediate position as shown in FIG. 14, it is necessary to manually rotate the heard guard core member 10 and thus the head guard portion 5 into the aligned or flush position of FIG. 14. When the baby carriage seat 1 is temporarily returned to the state shown in FIG. 13 to be then brought back again into the state shown in FIG. 14, the aforementioned manual rotation of the head guard portion 5 is unnecessary.

While the backrest core member 9 comprises three backrest plates 15 to 17 and the head guard core member 10 also comprises three head guard plates 18 to 20 in the aforementioned embodiment, the backrest core member and the head guard core member may be divided into any arbitrary number of portions.

Although the invention has been described and illustrated in detail, it is clearly understood that the same is by way of illustration and example only and is not to be taken by way of limitation, the spirit and scope of the present invention being limited only by the terms of the appended claims.

What is claimed is:

1. A seat for a baby carriage, comprising
 (a) a seat portion (8) including at least two seat core plates (12, 13) and first hinges (21) secured to a back side of said seat core plates for journalling said seat core plates to each other in a lengthwise direction,
 (b) a backrest portion (9) including at least two backrest core plates (15, 16) and second hinges (23) secured to a back side of said backrest core plates for journalling said backrest core plates to each other in said lengthwise direction,
 (c) a head guard portion (10) including at least two head guard core plates (18, 19) and third hinges (25) secured to a backside of said head guard core plates for journalling said head guard core plates to each other in said lengthwise direction, (d) fourth hinges (27, 28) secured to front sides of said head guard core plates (18, 19) and to front sides of said backrest core plates (15, 16) for journalling said head guard core plates and said backrest core plates to each other in a crosswise direction extending perpendicularly to said lengthwise direction, (e) said first (21), second (23), and third (25) hinges permitting a back folding so that said back sides face toward each other when a back folding of all core plates is completed, (f) first means for preventing a forward folding of said first, second, and third hinges (21, 23, 25) to normally keep all said core plates substantially flush with each other, (g) second means for preventing a back folding of said fourth hinges (27, 28) to normally keep said backrest core plates and said head guard core plates in a flush position relative to each other, and wherein (h) said fourth hinges (27, 28) permit a forward tilting of said head guard core plates (18, 19) so that said head guard core plates (18, 19) can assume a substantially upright guard position relative to said backrest core plates (15, 16) when a forward tilting of said head guard core plates is completed, whereby said head guard core plates (18, 19) in their upright guard position stiffen said backrest core plates (15, 16) and thereby prevent any folding of said backrest portion (9) and of said head guard portion (10), and whereby a forward tilting of said head guard core plates is possible only when said backrest core plates (15, 16) and said head guard core plates (18, 19) are in said flush position relative to each other.

2. The seat of claim 1, further comprising:

(a) inclination angle fixing means (61, 65, 66) for fixing said backrest portion in different inclined positions having different inclination angles relative to a horizontal plane, (b) head guard control means (80, 81, 82) connected to said head guard portion (10) for tilting said head guard portion (10) into said flush position relative to said backrest portion (9) when said backrest portion (9) is in a substantially upright position relative to said horizontal plane, and for tilting said head guard portion (10) into said upright guard position when said backrest portion (9) is in a most inclined substantially horizontal position, (c) said inclination angle fixing means comprising a backrest holding member (61) and a journal pin (62) forming a first journal for journalling said inclination angle fixing means to a fixed first location, said backrest portion (9) having a second journal (at 42) at a second location to permit said inclination angle of said backrest portion to be changed, said fixed first location differing from said second location in which said second journal (at 42) is located, (d) said seat further comprising a connecting mechanism securing said backrest holding member (61) to said backrest portion (9), said connecting mechanism comprising a combination of a slot (75) extending parallel to said backrest portion (9) and a guide pin (76) movably received in said slot (75) to permit said backrest portion (9) to move along said slot, so that no operation of said backrest holding member (61) is transmitted to said backrest portion (9) when said backrest portion is tilted up into a substantially upright state due to a movement of said guide pin (76) in said slot (75) while an operation of said backrest holding member (61) is transmitted to said backrest portion when said backrest portion (9) is tilted down into a substantially horizontal state due to said guide pin (76) now resting against an end wall of said slot (75), thereby moving said backrest portion (9) toward said substantially horizontal state, and wherein (e) said head guard control means comprise a control member (80), a further journal (79) for journalling said control member (80) to a fixed third location (at 79) spaced from said first location of said journal pin (62) of said backrest holding member (61), and a coupling (81, 82, 83) rotatably connecting said control member (80) to said head guard portion (10) in such a position that an operation of said control member (80) moves said head guard portion (10) into said guard position when said backrest portion (9) is moved into said substantially horizontal state and into a flush position when said backrest portion (9) is moved into a substantially upright position.

3. The seat of claim 1, wherein said first means for preventing a forward folding of said first, second, and third hinges (21, 23, 25) comprise longitudinal side edge surfaces along said backrest core plates and along said head guard core plates, said side edge surfaces abutting against each other along neighboring core plates to keep said core plates substantially flush with each other, and wherein said second means for preventing a back folding of said fourth hinges (27, 28) comprise crosswise end edge surfaces along ends of said head guard core plates (18, 19) and along ends of said backrest core plates (15, 16), said end edge surfaces abutting against each other to prevent back folding of said head guard portion (10) beyond a position in which said backrest portion and said head guard portion are flush with each other.

4. The seat of claim 1, wherein (a) said seat core plates comprise three seat core plates (12, 13, 14) and said backrest core plates comprise three backrest core plates (15, 16, 17) extending in parallel to each other along two dividing lines, respectively, for folding said seat widthwise with said first and second hinges, (b) said seat further comprising a pair of belt mounting members (43, 44) one of which is positioned on each side of said seat, said belt mounting members approaching each other in response to folding said baby carriage widthwise, and (c) a flexible belt (42) extending across said seat between said belt mounting members, said belt having end portions secured to said belt mounting members, and (d) wherein a lower end of at least one of said backrest core plates (16) is held by said belt (42), whereby said seat portion (8) and said backrest portion (9) are tiltable toward each other for folding said seat widthwise and away from each other for unfolding said seat.

5. A seat for a baby carriage comprising:

(a) a seat portion (8);

(b) a backrest portion (9) normally extending in a substantially upright position relative to a horizontal plane from a rear edge of said seat portion;

(c) a head guard portion (10) and hinges (27, 28, 29) journalling said head guard portion (10) to an upper end of said backrest portion (9);

(d) inclination angle fixing means for fixing said backrest portion in different inclined positions having different inclination angles relative to said horizontal plane; and (e) control means for bringing said bead guard portion into a position substantially flush with said backrest portion when said backrest portion moves into said substantially upright position, and for bringing said head guard portion into an upright guard position extending from said backrest portion in a most inclined state of said backrest portion, when said backrest portion (9) is moved into a substantially horizontal position, wherein (f) said inclination angle fixing means comprising a bracket (63), a backrest holding member (61) and a fixed first journal (62) journalling said backrest holding member (61) to said bracket (63), said backrest portion having a second journal (79) in said bracket (63) to permit said inclination angle of said backrest portion to be changed, said first journal (62) having a first location that is spaced from a second location in which said second journal (79) is located in said bracket (63), (g) wherein said backrest holding member (61) is connected to said backrest portion (9) through a connecting mechanism comprising a combination of a slot (75) extending parallel to said backrest portion (9) and a guide pin (76) movably received in said slot (75) to permit said backrest portion to move along said slot, said guide pin (76) in said slot (75) forming a movable third journal so that no operation of said backrest holding member (61) is transmitted to said backrest portion (9) when said backrest portion is tilted up into a substantially upright state due to a movement of said guide pin (76) in said slot (75) while an operation of said backrest holding member (61) is transmitted to said backrest portion when said backrest portion is tilted down into a substantially horizontal state due to said guide pin (76) now resting against an end wall of said slot (75), thereby moving said backrest portion toward said substantially horizontal state, (h) said control means comprising a control member (80) journalled at one end to said bracket (63) by said second journal (79) for journalling said control member (80) to a fixed point spaced from said first journal (62) journalling said backrest holding member (61) to said bracket (63), and a coupling (81, 82, 83) forming a fourth journal rotatably connecting said control member (80) to said head guard portion (10), said backrest holding member (61) and said control member (80) forming with said first, second, third and fourth journals a trapezium drive so that an operation of said control member (80) moves said head guard portion (10) into said guard position.

6. The seat of claim 5, wherein said backrest portion (9) and said head guard portion (10) comprise a backrest core member and a head guard core member, respectively, made of relatively rigid materials for providing dimensional stability, said backrest core member and said head guard core member each comprising respectively a plurality of backrest plates and a plurality of head guard plates extending in parallel with each other, respectively, for allowing a widthwise folding of said baby carriage, said seat further comprising a first set of hinges (23, 25) hinging said backrest plates to each other on back sides thereof and hinging said head guard plates to each other also on back sides thereof, and a second set of hinges (27, 28) hinging said backrest plates and said head guard plates to each other on front sides thereof, respectively, said first set of hinges (23, 25) having first hinging axes extending longitudinally of said backrest portion and of said head guard portion, said second set of hinges (27, 28) having second hinging axes extending in line with each other crosswise to said first hinging axis.

7. The seat of claim 6, wherein said plurality of backrest plates and said plurality of head guard plates have longitudinal edge surfaces abutting with each other between neighboring plates when said plates are substantially flush with each other, and wherein said backrest plates and said head guard plates have end edge surfaces that abut each other when said plates are in a position flush with each other.

8. The seat of claim 6, wherein said seat portion comprises a seat core member, wherein said backrest portion comprises a backrest core member, wherein said core members comprise respective plates made of relatively rigid materials for providing dimensional stability, said seat core member and said backrest core member comprising respectively three seat plates and three backrest plates extending in parallel with each other, respectively, for allowing folding of said baby carriage widthwise, said first set of hinges hinging said three seat plates to each other, said second set of hinges hinging said three backrest plates to each other, said seat further comprising a pair of belt mounting members (43, 44) one of which is positioned on each side of said seat, said belt mounting members approaching each other in response to folding said baby carriage widthwise, and a flexible belt (42) extending across said seat between said belt mounting members, said belt having end portions secured to said belt mounting members, and wherein a lower end of at least one of said backrest core plates (16) is held by said belt (42), whereby said seat portion (8) and said backrest portion (9) are tiltable toward each other for folding said seat widthwise and away from each other for unfolding said seat.

9. A seat for a baby carriage, comprising a seat portion (8), a backrest portion (9), an articulation structure (42, 44) tiltably securing said backrest portion to said seat portion (8) for permitting tilting said backrest portion back and forth between substantially upright backrest positions and a substantially horizontal backrest position, and a head guard portion (10), first hinges (27, 28, 29) tiltably securing said head guard portion (10) to said backrest portion for tilting said head guard portion (10) between a flush guard position relative to said backrest portion in said substantially upright backrest positions and an upright guard position relative to said backrest portion in said substantially horizontal backrest position, said baby seat further comprising a first linkage (61) operatively interposed between said baby seat and said backrest portion for holding said backrest portion in any one of said substantially upright backrest positions, a second linkage (80) operatively interposed between said baby seat and said head guard portion for bringing said head guard portion into said flush guard position in response to movement of said backrest portion into said substantially upright backrest position and for bringing said head guard portion into said upright guard position in response to movement of said backrest portion into said substantially horizontal backrest position wherein each of said seat portion, said backrest portion, and said head guard portion comprises a plurality of respective core sections, and further hinges (21; 23; 25) for hinging respective seat core sections to each other, respective backrest core sections to each other, and respective head guard core sections to each other for longitudinally folding said respective core sections to face each other in a folded state, and wherein said first hinges (27, 28, 29) are secured to a front side of said backrest portion and to a front side of said head Lard portion, and wherein said further hinges (21; 23; 25) are secured to back sides of said seat portion, said backrest portion and said head guard portion.

10. A seat for a baby carriage, comprising a seat portion (8), a backrest portion (9), an articulation structure (42, 44) tiltably securing said backrest portion to said seat portion (8)

for permitting tilting said backrest portion back and forth between substantially upright backrest positions and a substantially horizontal backrest position, and a head guard portion (10), first hinges (27, 28, 29) tiltably securing said head guard portion (10) to said backrest portion for tilting said head guard portion (10) between a flush guard position relative to said backrest portion in said substantially upright backrest positions and an upright guard position relative to said backrest portion in said substantially horizontal backrest position, said baby seat further comprising a first linkage (61) operatively interposed between said baby seat and said backrest portion for holding said backrest portion in any one of said substantially upright backrest positions, a second linkage (80) operatively interposed between said baby seat and said head guard portion for bringing said head guard portion into said flush guard position in response to movement of said backrest portion into said substantially upright backrest position and for bringing said head guard portion into said upright guard position in response to movement of said backrest portion into said substantially horizontal backrest position, wherein each of said seat portion, said backrest portion, and said head guard portion comprises a plurality of respective core sections, and further hinges (21; 23; 25) for hinging respective seat core sections to each other, respective backrest core sections to each other, and respective head guard core sections to each other for longitudinally folding said respective core sections to face each other in a folded state, wherein said seat core sections, said backrest core sections and said head guard core sections have longitudinal edge surfaces abutting each other in said seat portion, in said backrest portion, and said head guard portion respectively.

11. The baby seat of claim 9, wherein said articulation structure for tiltably securing said backrest portion to said seat portion comprises a belt mounting member (43, 44) positioned on each side of said seat portion, and a flexible belt (42) secured to said belt mounting members (43, 44), said backrest portion having a mounting section next to said seat portion secured to said flexible belt.

* * * * *

UNITED STATES PATENT AND TRADEMARK OFFICE
CERTIFICATE OF CORRECTION

PATENT NO. : 5,752,738
DATED : May 19, 1998
INVENTOR(S) : Onishi et al.

It is certified that error appears in the above-indentified patent and that said Letters Patent is hereby corrected as shown below:

Col. 2, line 61, after "axis" replace "(a" by --forming a first journal at a--,
after "location" delete "forming a first journal";
line 62, before "62)" delete "at" (first occurrence).

Col. 3, line 18, after "axis" insert --forming a second journal--,
after "fixed" replace "third" by --second--.

Col. 11, line 17, after "the" (first occurrence) insert --first--;
after "the" (second occurrence) delete "first";
line 62, after "the" insert --third journal--.

Col. 16, line 53, after "position" insert --,--;
line 62, after "head" replace "Lard" by --guard--.

Signed and Sealed this

Twenty-first Day of July, 1998

Attest:

Attesting Officer

BRUCE LEHMAN

Commissioner of Patents and Trademarks